(12) United States Patent
Zhu

(10) Patent No.: US 12,328,755 B2
(45) Date of Patent: Jun. 10, 2025

(54) METHOD AND APPARATUS FOR DETERMINING STARTING POSITION OF CHANNEL OCCUPANCY TIME

(71) Applicant: Beijing Xiaomi Mobile Software Co., Ltd., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 670 days.

(21) Appl. No.: 17/597,137

(22) PCT Filed: Jun. 28, 2019

(86) PCT No.: PCT/CN2019/093807
§ 371 (c)(1),
(2) Date: Dec. 27, 2021

(87) PCT Pub. No.: WO2020/258275
PCT Pub. Date: Dec. 30, 2020

(65) Prior Publication Data
US 2022/0256597 A1     Aug. 11, 2022

(51) Int. Cl.
*H04W 74/0808* (2024.01)
*H04W 16/14* (2009.01)
*H04W 72/0446* (2023.01)

(52) U.S. Cl.
CPC ....... *H04W 74/0808* (2013.01); *H04W 16/14* (2013.01); *H04W 72/0446* (2013.01)

(58) Field of Classification Search
CPC ............. H04W 16/14; H04W 72/0446; H04W 74/0808
See application file for complete search history.

(56) References Cited

U.S. PATENT DOCUMENTS

| | | | |
|---|---|---|---|
| 11,206,549 B1* | 12/2021 | Eyuboglu | H04W 72/1273 |
| 2020/0106550 A1* | 4/2020 | Yoshimoto | H04L 1/0026 |
| 2020/0374933 A1* | 11/2020 | Lou | H04W 74/006 |
| 2020/0396686 A1* | 12/2020 | Tiirola | H04W 52/0229 |
| 2021/0007143 A1* | 1/2021 | Zhou | H04W 74/0816 |
| 2021/0235491 A1* | 7/2021 | Iyer | H04W 72/23 |

FOREIGN PATENT DOCUMENTS

| | | |
|---|---|---|
| CN | 105578573 A | 5/2016 |
| CN | 105611552 A | 5/2016 |
| CN | 105636090 A | 6/2016 |
| CN | 105636225 A | 6/2016 |
| CN | 109756975 A | 5/2019 |
| CN | 109906578 A | 6/2019 |
| WO | 2019056370 A1 | 3/2019 |

* cited by examiner

*Primary Examiner* — Brian P Cox
(74) *Attorney, Agent, or Firm* — McCoy Russell LLP

(57) ABSTRACT

A method for determining a starting position of a channel occupancy time can include: determining, according to configuration information, a first period of a starting position of a downlink channel occupancy time; periodically determining, according to the first period, whether information sent by a base station is received in an unlicensed frequency band; and if the information sent by the base station is received in the unlicensed frequency band, determining that the time when the information is received from the base station is the starting position of the downlink channel occupancy time of the unlicensed frequency band.

15 Claims, 12 Drawing Sheets

METHOD AND APPARATUS FOR DETERMINING STARTING POSITION OF CHANNEL OCCUPANCY TIME

CROSS REFERENCE TO RELATED APPLICATION

The present application is a U.S. National Phase of International Application No. PCT/CN2019/093807 entitled "METHOD AND APPARATUS FOR DETERMINING STARTING POSITION OF CHANNEL OCCUPANCY TIME," and filed on Jun. 28, 2019. The entire contents of the above-listed application is hereby incorporated by reference for all purposes.

BACKGROUND AND SUMMARY

With the expansion of terminal and base station communication scenarios, the communication between a terminal and a base station is not limited to a licensed frequency band, but can also be in an unlicensed frequency band.

However, the unlicensed frequency band is not only occupied by the communication between the terminal and the base station, but may be occupied by the communication of other devices. So that, when the terminal and the base station need to communicate, if the unlicensed frequency band needs to be occupied, the sending end that sends information can detect whether a channel, specifically a channel of the unlicensed frequency band, is clear by using an LBT (Listen Before Talk) detection mechanism, and the unlicensed frequency band can be occupied for communication when the channel of the unlicensed frequency band is clear.

The receiving end that receives information needs to continuously monitor the channel of the unlicensed frequency band to determine whether it has received the information from the sending end, and starts to receive the information when it has received the information sent by the sending end.

According to a first aspect of the examples of the present disclosure, a method for determining a starting position of a channel occupancy time is proposed, which is applicable to a terminal, the method including:

determining, according to configuration information, a first period of a starting position of a downlink channel occupancy time, and/or a second period of a starting position of an uplink channel occupancy time;

periodically determining, according to the first period, whether information sent by a base station is received in an unlicensed frequency band, and/or periodically sending, according to the second period, information to the base station in a clear time period of the unlicensed frequency band; and in response to the information sent by the base station is received in the unlicensed frequency band, determining that the time when the information is received from the base station is the starting position of the downlink channel occupancy time of the unlicensed frequency band.

According to a second aspect of the examples of the present disclosure, a method for determining a starting position of a channel occupancy time is proposed, the method including:

periodically receiving, according to a second period, information sent by a terminal in an unlicensed frequency band; and in response to the information sent by the terminal is received in the unlicensed frequency band, determining that the time when the information sent by the terminal is received is the starting position of the uplink channel occupancy time of the unlicensed frequency band.

According to a third aspect of the examples of the present disclosure, an electronic device is proposed, including:
a processor; and
a memory for storing processor executable instructions;
wherein, the processor is configured to implement the method applicable to a terminal as described in any of the above examples.

According to a fourth aspect of the examples of the present disclosure, an electronic device is proposed, including:
a processor; and
a memory for storing processor executable instructions;
wherein, the processor is configured to implement the method applicable to a base station as described in any of the above examples.

According to a fifth aspect of the examples of the present disclosure, a non-transitory computer-readable storage medium is proposed, storing a computer program on the storage medium, wherein when the program is executed by a processor, the steps in the method applicable to a terminal described in any of the above examples are implemented.

According to an sixth aspect of the examples of the present disclosure, a non-transitory computer-readable storage medium is proposed, storing a computer program on the storage medium, wherein when the program is executed by a processor, the steps in the method applicable to a base station described in any of the above examples are implemented.

According to the examples of the present disclosure, the terminal when serving as a receiving end can determine, according to configuration information, a first period of a starting position of a downlink channel occupancy time, then periodically determine, according to the first period, whether information sent by a base station is received in an unlicensed frequency band, and determine that the time when the information is received from the base station is the starting position of the downlink channel occupancy time of the unlicensed frequency band if the information sent by the base station is received in the unlicensed frequency band.

Accordingly, the terminal can periodically determine whether the information sent by the base station is received in the unlicensed frequency band, then if the information sent by the base station is received in the unlicensed frequency band, the terminal starts to receive the information sent by the base station from the starting position of the downlink channel occupancy time of the unlicensed frequency band, i.e., the time when the information is received from the base station, without continuously monitoring the channel of the unlicensed frequency band, thus reducing the power consumption of the terminal.

According to the examples of the present disclosure, the terminal when serving as a transmitting end can determine, according to configuration information, a second period of a starting position of an uplink channel occupancy time, and periodically send, according to the second period, information to the base station in a clear time period of the unlicensed frequency band. The base station serving as a receiving end can periodically receive, according to the second period, information sent by the terminal in the unlicensed frequency band, and determine that the time when the information sent by the terminal is received is the starting position of the uplink channel occupancy time of the unlicensed frequency band if the information sent by the terminal is received in the unlicensed frequency band.

Accordingly, the base station can periodically determine whether the information sent by the terminal is received in the unlicensed frequency band, then if the information sent by the base station is received in the unlicensed frequency band, the base station starts to receive the information sent by the terminal from the starting position of the uplink channel occupancy time of the unlicensed frequency band, i.e., the time when the information is received from the terminal, without continuously monitoring the channel of the unlicensed frequency band, thus reducing the power consumption of the base station.

BRIEF DESCRIPTION OF THE FIGURES

In order to describe the technical solutions in the examples of the present disclosure more clearly, the following briefly introduces the accompanying drawings required for describing the examples. Apparently, the accompanying drawings in the following description show only some examples of the present disclosure, and those of ordinary skill in the art may still derive other drawings from these drawings without any creative efforts.

DETAILED DESCRIPTION

The technical solutions in the examples of the present disclosure will be clearly and completely described below with reference to the accompanying drawings in the examples of the present disclosure. Apparently, the examples described are only some of the examples of the present disclosure, not all of them. All other examples obtained by those of ordinary skill in the art based on the examples of the present disclosure without any creative efforts shall fall within the protection scope of the present disclosure.

Figure 1:
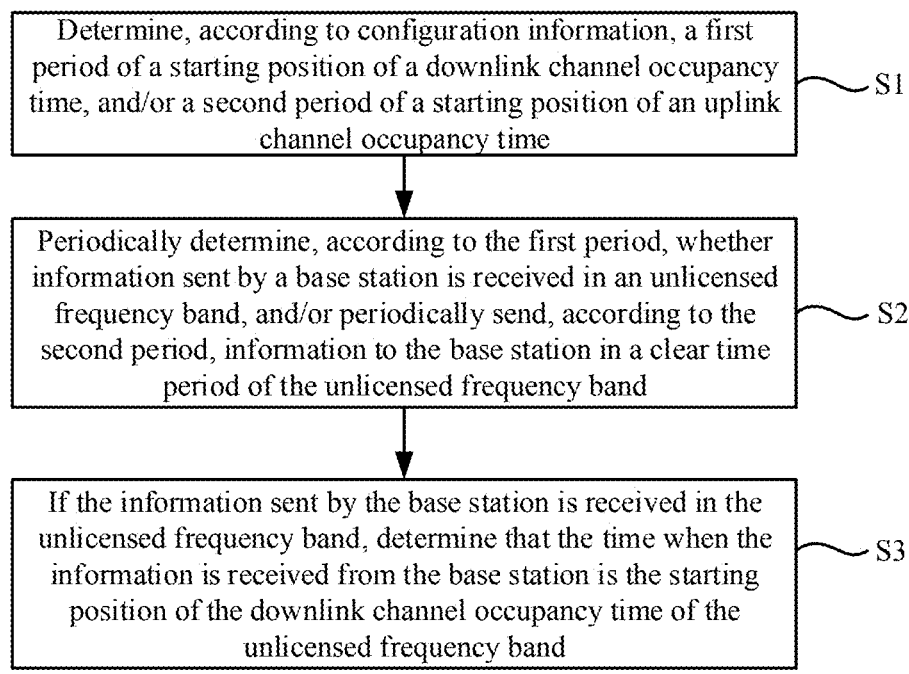
FIG. 1 is a schematic flowchart of a method for determining a starting position of a channel occupancy time according to an example of the present disclosure.

FIG. 1 is a schematic flowchart of a method for determining a starting position of a channel occupancy time according to an example of the present disclosure. The method for determining a starting position of a channel occupancy time shown in this example may be applied to a terminal. The terminal includes but is not limited to electronic devices such as a mobile phone, a tablet computer, and a wearable device. The terminal may serve as user equipment to communicate with a base station, and it may communicate with the base station through a licensed frequency band (for example, a frequency band of an operator network), or communicate with the base station through an unlicensed frequency band (for example, a frequency band of a Wi-Fi network).

As shown in FIG. 1, the method for determining a starting position of a channel occupancy time may include the following steps:

In step S1, a first period of a starting position of a downlink channel occupancy time, and/or a second period of a starting position of an uplink channel occupancy time is/are determined according to configuration information;

It should be noted that, for the same terminal, the configuration information on the basis of which the first period is determined and the configuration information on the basis of which the second period is determined may be the same configuration information or different configuration information;

In step S2, whether information sent by a base station is received in an unlicensed frequency band is periodically determined according to the first period, and/or information is periodically sent according to the second period to the base station in a clear time period of the unlicensed frequency band;

In step S3, if the information sent by the base station is received in the unlicensed frequency band, it is determined that the time when the information is received from the base station is the starting position of the downlink channel occupancy time of the unlicensed frequency band.

In related technologies, detection mechanisms for channels in unlicensed frequency bands include but are not limited to cat1 (no LBT), cat2 (no random backoff LBT), cat3 (random backoff LBT using a fixed-size contention window) and cat4 (random backoff LBT using a non-fixed-size contention window). The following mainly takes cat2 and cat4 as examples to illustrate the examples of the present disclosure.

Figure 2:
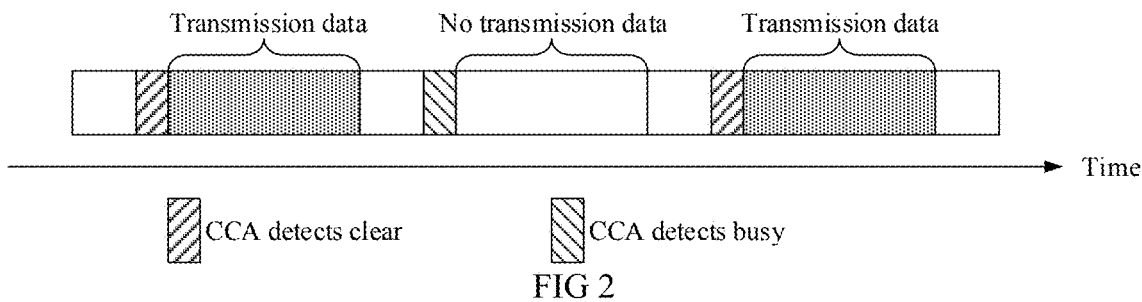
FIG. 2 is a schematic diagram of a cat2 detection mechanism.

FIG. 2 is a schematic diagram of a cat2 detection mechanism.

As shown in FIG. 2, based on the cat2 detection mechanism, the sending end that sends data during the communication between the terminal and the base station can detect whether the channel of the unlicensed frequency band is occupied within a time corresponding to a CCA (Clear Channel Assessment), for example, each CCA corresponds to a slot, and the interval of each CCA and the channel occupancy time are fixed.

In FIG. 2, the channel detection results of the unlicensed frequency band in the first CCA and the third CCA are that the channel is clear, indicating that the channel of the unlicensed frequency band is not occupied by other devices, then the channel of the unlicensed frequency band can be occupied after the two CCAs to transmit data. The channel detection result of the unlicensed frequency band in the second CCA is that the channel is busy, indicating that the channel of the unlicensed frequency band is occupied by other devices, then after this CCA, the channel of the unlicensed frequency band will not be occupied to transmit data.

Figure 3:
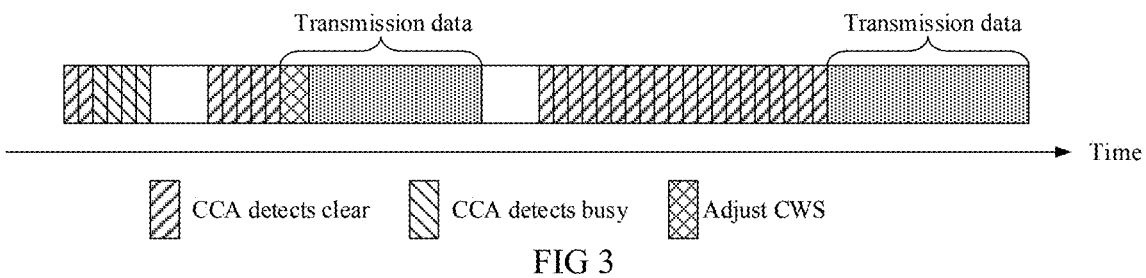
FIG. 3 is a schematic diagram of a cat4 detection mechanism.

FIG. 3 is a schematic diagram of a cat4 detection mechanism.

As shown in FIG. 3, based on the cat4 detection mechanism, a count value N of a backoff counter may be uniformly and randomly generated from 0 to a Contention Window Size (CWS), where N is between 0 and CWS.

When CCA detects that the channel of the unlicensed frequency band is clear, the count value of the counter is reduced by 1. When CCA detects that the channel of the unlicensed frequency band is busy, the count value of the counter does not change. When the count value of the counter is 0, the channel of the unlicensed frequency band is immediately occupied.

The CWS is a dynamic value. The CWS can be dynamically adjusted based on whether the data previously sent is successfully received by the receiving end, to obtain an appropriate value of CWS according to the state of the channel and the network service load, thus achieving a compromise between reducing collisions of sending ends and improving channel access efficiency.

For example, in FIG. 3, when the sending end sends data to the receiving end for the first time, the CWS used to detect the channel is 15, and the count value of the counter is 7. After two CCAs detect that the channel of the unlicensed frequency band is clear, four CCAs detect that the channel of the unlicensed frequency band is busy, and five CCAs detect that the channel of the unlicensed frequency band is clear, that is, a total of seven CCAs detect that the channel of the unlicensed frequency band is clear, then the count value of the counter is reduced to 0, and the channel of the unlicensed frequency band is occupied to send data to the receiving end.

However, the receiving end fails to receive the data. Then the sending end can adjust the CWS while occupying the channel of the unlicensed frequency band, for example, increase the CWS to 31, the count value of the counter is 20, then when the sending end sends data to the receiving end for the second time, after 20 CCAs detect that the channel of the unlicensed frequency band is clear, the channel of the unlicensed frequency band is occupied to send data to the receiving end.

Figure 4:
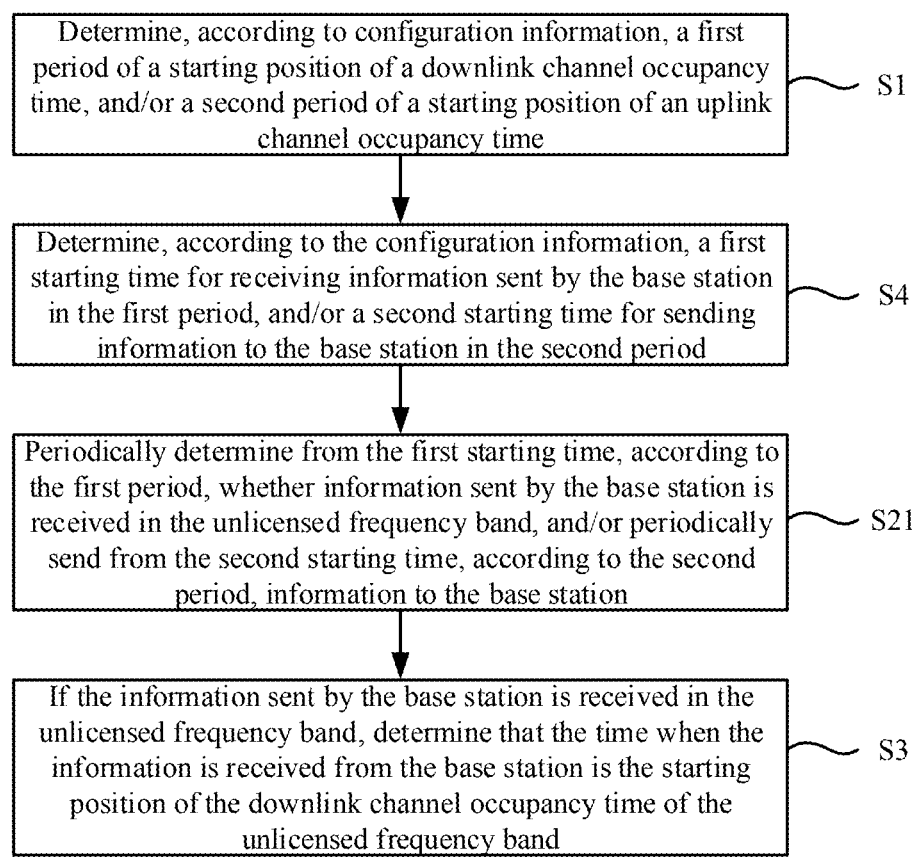
FIG. 4 is a schematic flowchart of another method for determining a starting position of a channel occupancy time according to an example of the present disclosure.

Regardless of the cat2 detection mechanism shown in FIG. 2 or the cat4 detection mechanism shown in FIG. 4, the sending end in the base station and the terminal that sends information performs each CCA and sends data to the receiving end on the channel of the unlicensed frequency band, but the receiving end does not know the starting position of the channel occupancy time of the sending end in the unlicensed frequency band, so the receiving end cannot determine the time from which it starts to receive the information sent by the sending end, needs to continuously monitor the channel of the unlicensed frequency band to determine whether it has received the information sent by the sending end, and starts to receive the information sent by the sending end when it has received the information sent by the sending end, which causes a lot of power consumption at the receiving end.

According to the examples of the present disclosure, the terminal when serving as a receiving end can determine, according to configuration information, a first period of a starting position of a downlink channel occupancy time, then periodically determine, according to the first period, whether information sent by a base station is received in an unlicensed frequency band, and determine that the time when the information is received from the base station is the starting position of the downlink channel occupancy time of the unlicensed frequency band if the information sent by the base station is received in the unlicensed frequency band.

Accordingly, the terminal can periodically determine whether the information sent by the base station is received in the unlicensed frequency band, then if the information sent by the base station is received in the unlicensed frequency band, the terminal starts to receive the information sent by the base station from the starting position of the downlink channel occupancy time of the unlicensed frequency band, i.e., the time when the information is received from the base station, without continuously monitoring the channel of the unlicensed frequency band, thus reducing the power consumption of the terminal.

It should be noted that the first period is a possible period of the starting position of the downlink channel occupancy time. In the actual communication process, the base station may change the starting position of the downlink channel occupancy time to change the first period.

According to the examples of the present disclosure, the terminal when serving as a transmitting end can determine, according to configuration information, a second period of a starting position of an uplink channel occupancy time, and periodically send, according to the second period, information to the base station in a clear time period of the unlicensed frequency band. The base station serving as a receiving end can periodically receive, according to the second period, information sent by the terminal in the unlicensed frequency band, and determine that the time when the information sent by the terminal is received is the starting position of the uplink channel occupancy time of the unlicensed frequency band if the information sent by the terminal is received in the unlicensed frequency band.

Accordingly, the base station can periodically determine whether the information sent by the terminal is received in the unlicensed frequency band, then if the information sent by the base station is received in the unlicensed frequency band, the base station starts to receive the information sent by the terminal from the starting position of the uplink channel occupancy time of the unlicensed frequency band, i.e., the time when the information is received from the terminal, without continuously monitoring the channel of the unlicensed frequency band, thus reducing the power consumption of the base station.

It should be noted that the second period is a possible period of the starting position of the uplink channel occupancy time. In the actual communication process, the terminal may change the starting position of the uplink channel occupancy time to change the second period.

FIG. 4 is a schematic flowchart of another method for determining a starting position of a channel occupancy time according to an example of the present disclosure. As shown in FIG. 4, before whether information sent by a base station is received in an unlicensed frequency band is periodically determined according to the first period, and/or information is periodically sent according to the second period to the base station in a clear time period of the unlicensed frequency band, the method further includes:

In step S4, a first starting time for receiving information sent by the base station in the first period, and/or a second starting time for sending information to the base station in the second period are determined according to the configuration information;

The periodically determining, according to the first period, whether information sent by a base station is received in an unlicensed frequency band, and/or periodically sending, according to the second period, information to the base station in a clear time period of the unlicensed frequency band includes:

In step S21, whether information sent by the base station is received in the unlicensed frequency band is periodically determined from the first starting time according to the first period, and/or information is periodically sent to the base station from the second starting time according to the second period.

In an example, the configuration information may also indicate a first starting time for receiving information sent by the base station in the first period. Then, the terminal may periodically receive information sent by the base station in the unlicensed frequency band from the first starting time.

Since the first starting time is the time when the base station is more likely to send information in the first period, and the terminal receives information sent by the base station in the unlicensed frequency band from the first starting time in the first period, the terminal can receive the information sent by the base station as soon as possible and then determine a starting position of a downlink channel occupancy time as soon as possible.

In an example, the configuration information may also indicate a second starting time for sending information to the base station in the second period. Then, the terminal may periodically send information to the base station in the unlicensed frequency band from the second starting time.

Since the second starting time may be configured by the base station to the terminal, the terminal is more likely to start sending information from the second starting time in the second period, and the base station starts receiving information sent by the terminal in the unlicensed frequency band from the second starting time in the second period, the base station can receive the information sent by the terminal as soon as possible in the second period and then determine a starting position of an uplink channel occupancy time as soon as possible.

Optionally, the first period and/or the second period include at least one slot, and the first starting time and/or the second starting time are symbols.

In an example, the first period may include at least one slot, the second period may also include at least one slot, the first starting time may be a symbol in the slot, and the second starting time may also be a symbol in the slot.

Optionally, the configuration information is used to indicate target symbols where the first starting time and/or the second starting time are located in the at least one slot.

In an example, the configuration information may directly indicate symbols where the first starting time and/or the second starting time are located in the at least one slot. Taking the first starting time as an example, 1 slot includes 14 symbols. The first starting time is located in at least one slot corresponding to the first period. For example, the first period is 1 slot, the first starting time is the first symbol in the 1 slot, then the configuration information may directly indicate that the first starting time is in the first symbol. For example, the first period is 2 slots, the first starting time is the first symbol in the second slot, then the configuration information may directly indicate that the first starting time is in the 15th symbol.

The configuration information may be indicated by a bitmap. For example, if the configuration information directly indicates that the first starting time is in the first symbol, it can be indicated by the information "10000000000000"; for example, if the configuration information directly indicates that the first starting time is in the 15th symbol, it can be indicated by the information "000000000000001000000000000000", where 1 represents the first starting time.

Optionally, the configuration information includes first partial information and second partial information;

The first partial information is used to indicate target slots where the first starting time and/or the second starting time are located in the at least one slot, and the second partial information is used to indicate target symbols where the first starting time and/or the second starting time are located in the target slots.

In an example, the configuration information may indicate the first starting time and/or the second starting time through the first partial information and the second partial information.

Taking the first starting time as an example, the first period is 3 slots, the first starting time is the 13th symbol in the second slot, then the value of the bit corresponding to the first partial information is 010, indicating that the first starting time is in the second slot of the 3 slots; the value of the bit corresponding to the second partial information is 1101, indicating that the first starting time is the 13th symbol of the target slot; thus, by combining the first partial information and the second partial information, it can be determined that the first starting time is the 13th symbol of the second slot.

Accordingly, the first starting time can be indicated by the number of bits less than the number of all symbols in at least one slot, which is beneficial to reducing the data volume of the configuration information.

Figure 5:
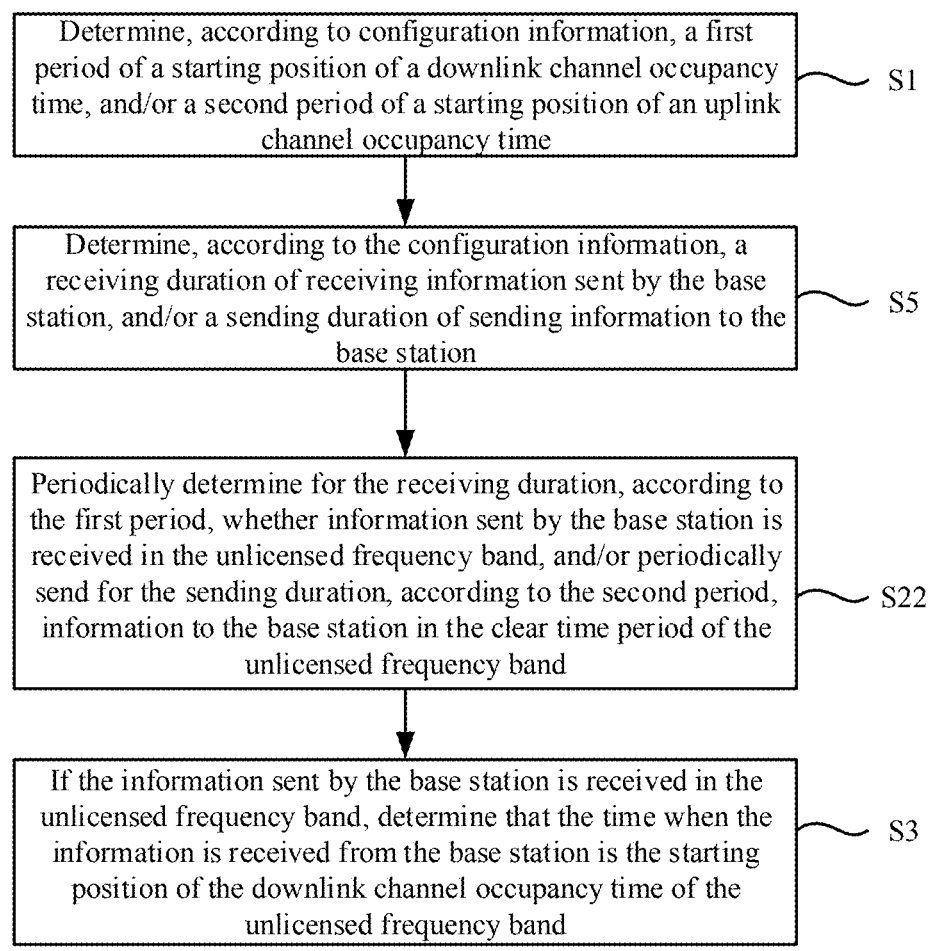
FIG. 5 is a schematic flowchart of yet another method for determining a starting position of a channel occupancy time according to an example of the present disclosure.

FIG. 5 is a schematic flowchart of yet another method for determining a starting position of a channel occupancy time according to an example of the present disclosure. As shown in FIG. 5, before whether information sent by a base station is received in an unlicensed frequency band is periodically determined according to the first period, and/or information is periodically sent according to the second period to the base station in a clear time period of the unlicensed frequency band, the method further includes:

In step S5, a receiving duration of receiving information sent by the base station, and/or a sending duration of sending information to the base station are determined according to the configuration information;

The periodically determining, according to the first period, whether information sent by a base station is received in an unlicensed frequency band, and/or periodically sending, according to the second period, information to the base station in a clear time period of the unlicensed frequency band includes:

In step S22, whether information sent by the base station is received in the unlicensed frequency band is periodically determined for the receiving duration according to the first period, and/or information is periodically sent for the sending duration according to the second period to the base station in the clear time period of the unlicensed frequency band.

In an example, the configuration information may also indicate a receiving duration of receiving information sent by the base station in the first period. Then, the terminal may periodically determine for the receiving duration, according to the first period, whether information sent by the base station is received in the unlicensed frequency band.

Since the receiving duration is a duration that the base station sends information more likely to last in the first period, the terminal receives the information sent by the base station in the unlicensed frequency band for the receiving duration in the first period, which ensures that the terminal only determines whether the information sent by the base station is received within the time period when the base station sends information, and avoids power waste caused by determining whether the information sent by the base station is received within the time period when the base station does not send information.

The example shown in FIG. 5 may be combined with the example shown in FIG. 4, then the terminal determines for the receiving duration whether the information sent by the base station is received in the unlicensed frequency band, where the receiving duration may last from the first starting time, or the receiving duration may last behind the first starting time; the duration from the starting time of the receiving duration to the first starting time should be less than a preset duration, to ensure that the base station still sends information and the terminal can receive the information sent by the base station within the receiving duration; or the receiving duration may last after the first starting time, and the ending time of the receiving duration should be behind the first starting time, to ensure that the base station still sends information and the terminal can receive the information sent by the base station within the receiving duration.

In an example, the configuration information may also indicate a sending duration of sending information to the base station in the second period. Then, the terminal may periodically send for the sending duration, according to the second period, information to the base station.

Since the sending duration may be configured by the base station to the terminal, that is, the base station may determine the sending duration, then the terminal sends information to the base station more likely for the sending duration, and the base station can receive the information sent by the terminal in the unlicensed frequency band for the sending duration in the second period, which ensures that the base station only determines whether the information sent by the terminal is received within the time period when the terminal sends information, and avoids power waste caused by determining whether the information sent by the terminal is received within the time period when the terminal does not send information.

Figure 6:
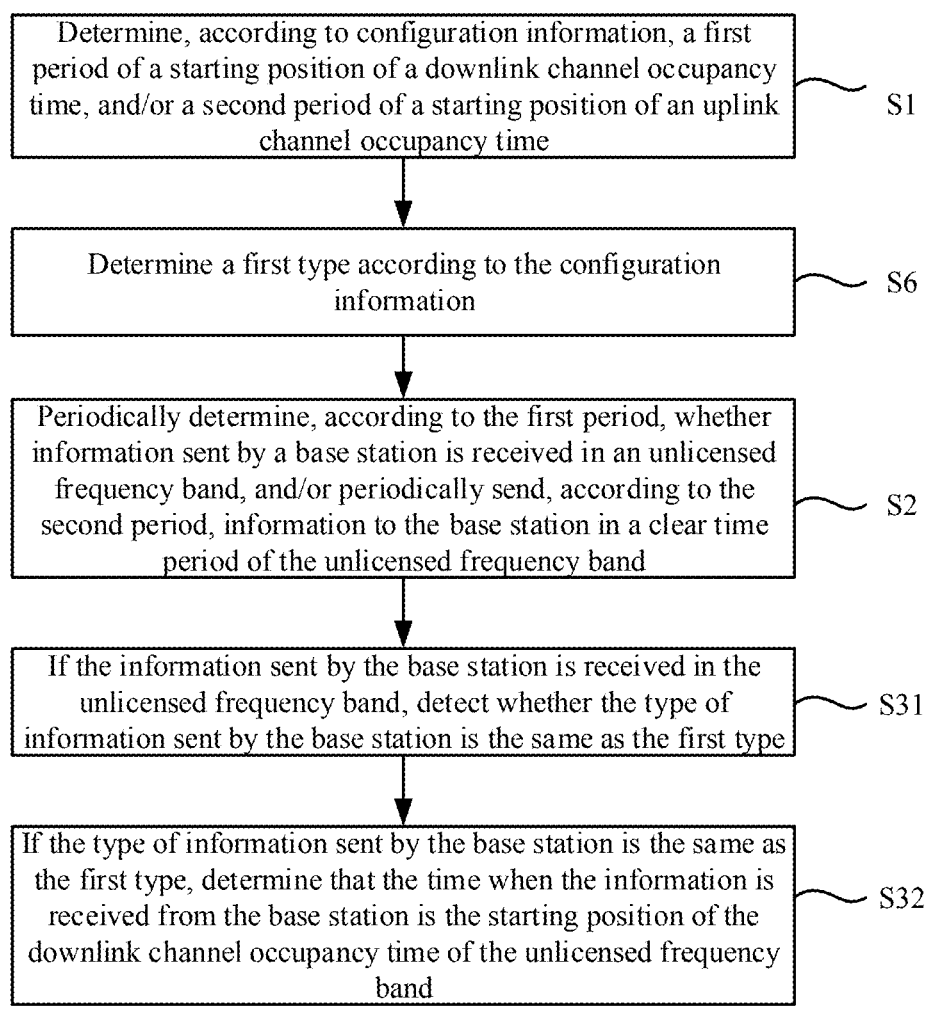
FIG. 6 is a schematic flowchart of yet another method for determining a starting position of a channel occupancy time according to an example of the present disclosure.

FIG. 6 is a schematic flowchart of yet another method for determining a starting position of a channel occupancy time according to an example of the present disclosure. As shown in FIG. 6, before whether information sent by a base station is received in an unlicensed frequency band is periodically determined according to the first period, and/or information is periodically sent according to the second period to the base station in a clear time period of the unlicensed frequency band, the method further includes:

In step S6, a first type is determined according to the configuration information;

The if the information sent by the base station is received in the unlicensed frequency band, determining that the time when the information is received from the base station is the starting position of the downlink channel occupancy time of the unlicensed frequency band includes:

In step S31, if the information sent by the base station is received in the unlicensed frequency band, whether the type of information sent by the base station is the same as the first type is determined;

In step S32, if the type of information sent by the base station is the same as the first type, it is determined that the time A when the information is received from the base station is the starting position of the downlink channel occupancy time of the unlicensed frequency band.

In an example, the configuration information may also indicate a first type. When the terminal receives information sent by the base station in the unlicensed frequency band, it can detect whether the type of information sent by the base station is the same as the first type; and when the type of information sent by the base station is the same as the first type, it is determined that the time when the information is received from the base station is the starting position of the downlink channel occupancy time of the unlicensed frequency band.

Accordingly, the terminal can only use the time when the base station sends the first type of information as the starting position of the downlink channel occupancy time, which prevents the terminal from mistakenly using the time when the base station sends other types of information as the starting position of the downlink channel occupancy time.

Figure 7:
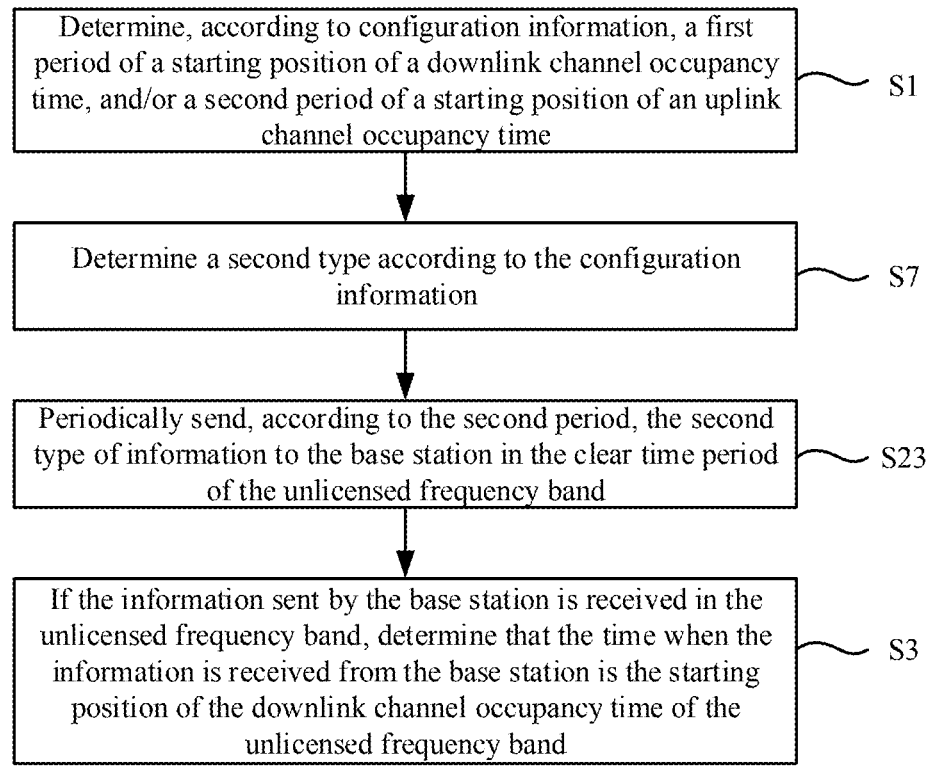
FIG. 7 is a schematic flowchart of yet another method for determining a starting position of a channel occupancy time according to an example of the present disclosure.

FIG. 7 is a schematic flowchart of yet another method for determining a starting position of a channel occupancy time according to an example of the present disclosure. As shown in FIG. 7, before whether information sent by a base station is received in an unlicensed frequency band is periodically determined according to the first period, and/or information is periodically sent according to the second period to the base station in a clear time period of the unlicensed frequency band, the method further includes:

In step S7, a second type is determined according to the configuration information;

The periodically sending, according to the second period, information to the base station in a clear time period of the unlicensed frequency band includes:

In step S23, the second type of information is periodically sent according to the second period to the base station in the clear time period of the unlicensed frequency band.

In an example, the configuration information may also indicate a second type, and the terminal may periodically send, according to the second period, the second type of information to the base station in the clear time period of the unlicensed frequency band.

Since the second type may be configured by the base station to the terminal, that is, the base station may determine the second type, and when receiving information sent by the terminal in the unlicensed frequency band, the base station may detect whether the type of information sent by the terminal is the same as the second type; and only when the type of information sent by the terminal is the same as the second type, it is determined that the time when the information is received from the terminal is the starting position of the uplink channel occupancy time of the unlicensed frequency band.

Accordingly, the base station can only use the time when the terminal sends the second type of information as the starting position of the uplink channel occupancy time, which prevents the base station from mistakenly using the time when the terminal sends other types of information as the starting position of the uplink channel occupancy time.

Figure 8:
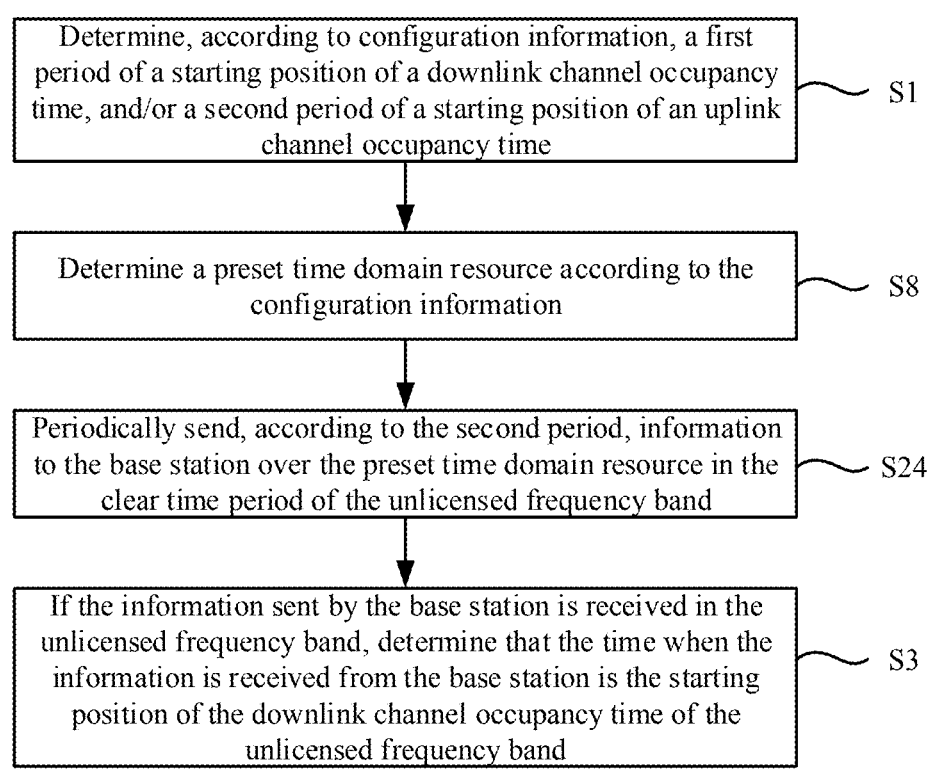
FIG. 8 is a schematic flowchart of yet another method for determining a starting position of a channel occupancy time according to an example of the present disclosure.

FIG. 8 is a schematic flowchart of yet another method for determining a starting position of a channel occupancy time according to an example of the present disclosure. As shown in FIG. 8, before whether information sent by a base station is received in an unlicensed frequency band is periodically determined according to the first period, and/or information is periodically sent according to the second period to the base station in a clear time period of the unlicensed frequency band, the method further includes:

In step S8, a preset time domain resource is determined according to the configuration information;

The periodically sending, according to the second period, information to the base station in a clear time period of the unlicensed frequency band includes:

In step S24, information is periodically sent according to the second period to the base station over the preset time domain resource in the clear time period of the unlicensed frequency band.

In an example, the configuration information may also configure a preset time domain resource, and information is periodically sent according to the second period to the base station over the preset time domain resource in the clear time period of the unlicensed frequency band.

Since the preset time domain resource may be configured by the base station to the terminal, that is, the base station may determine the preset time domain resource, the base station may receive the information sent by the terminal over the preset time domain resource of the unlicensed frequency band. Accordingly, the terminal can only send information to the base station over the preset time domain resource in the clear time period of the unlicensed frequency band, and the base station also only receives the information sent by the terminal over the preset time domain resource of the unlicensed frequency band, which avoids resource waste caused by the fact that the base station receives information sent by the terminal over time domain resources (the terminal does not send information to the base station over these time domain resources) other than the preset time domain resource.

Optionally, the configuration information is pre-defined (for example, pre-defined by a communication protocol between the base station and the terminal) or pre-configured by the base station.

Optionally, before detecting the type of information received from the base station in the unlicensed frequency band, the method further includes:

A duration configured by the configuration information that the base station occupies the downlink channel of the unlicensed frequency band is determined.

In an example, the configuration information may also indicate a terminal about a duration that the base station occupies the downlink channel of the unlicensed frequency band, and accordingly, the receiving duration that the terminal determines in each first period whether the information sent by the base station is received in the unlicensed frequency band may be less than or equal to the duration that the base station occupies the downlink channel of the unlicensed frequency band, which prevents the terminal from receiving information sent by the base station beyond the time period during which the base station occupies the downlink channel of the unlicensed frequency band, and then avoids waste of terminal resources.

Figure 9:
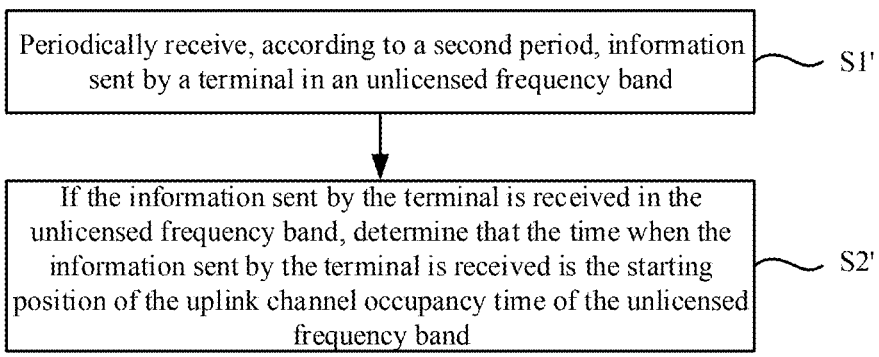
FIG. 9 is a schematic flowchart of a method for determining a starting position of a channel occupancy time according to an example of the present disclosure.

FIG. 9 is a schematic flowchart of a method for determining a starting position of a channel occupancy time according to an example of the present disclosure. The method for determining a starting position of a channel occupancy time shown in this example may be applied to a base station. The terminal may communicate with the terminal in the above example, and it may communicate with the base station through a licensed frequency band (for example, a frequency band of an operator network), or communicate with the terminal through an unlicensed frequency band (for example, a frequency band of a Wi-Fi network).

As shown in FIG. 9, the method for determining a starting position of a channel occupancy time may include the following steps:

In step S1', information sent by a terminal is periodically received in an unlicensed frequency band according to a second period;

In step S2', if the information sent by the terminal is received in the unlicensed frequency band, it is determined that the time when the information sent by the terminal is received is the starting position of the uplink channel occupancy time of the unlicensed frequency band.

According to the examples of the present disclosure, the terminal when serving as a transmitting end can determine, according to configuration information, a second period of a starting position of an uplink channel occupancy time, and periodically send, according to the second period, information to the base station in a clear time period of the unlicensed frequency band. The base station serving as a receiving end can periodically receive, according to the second period, information sent by the terminal in the unlicensed frequency band, and determine that the time when the information sent by the terminal is received is the starting position of the uplink channel occupancy time of the unlicensed frequency band if the information sent by the terminal is received in the unlicensed frequency band.

Accordingly, the base station can periodically determine whether the information sent by the terminal is received in the unlicensed frequency band, then if the information sent by the base station is received in the unlicensed frequency band, the base station starts to receive the information sent by the terminal from the starting position of the uplink channel occupancy time of the unlicensed frequency band, i.e., the time when the information is received from the terminal, without continuously monitoring the channel of the unlicensed frequency band, thus reducing the power consumption of the base station.

Figure 10:
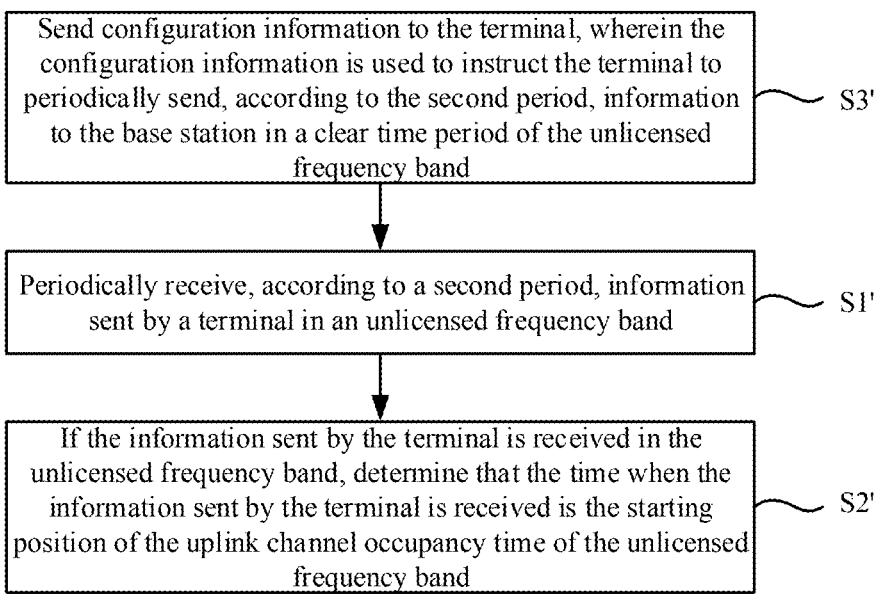
FIG. 10 is a schematic flowchart of another method for determining a starting position of a channel occupancy time according to an example of the present disclosure.

FIG. 10 is a schematic flowchart of another method for determining a starting position of a channel occupancy time according to an example of the present disclosure. As shown in FIG. 10, before periodically receiving, according to a second period, information sent by a terminal in an unlicensed frequency band, the method further includes:

In step S3', configuration information is sent to the terminal, wherein the configuration information is used to instruct the terminal to periodically send, according to the second period, information to the base station in a clear time period of the unlicensed frequency band.

In an example, the base station may configure the second period to the terminal through the configuration information, so that the second period is controllable. In addition, the second period may also be pre-defined, for example, pre-defined by a communication protocol between the base station and the terminal.

Optionally, the configuration information is also used to indicate a second starting time when the terminal sends information to the base station in the second period.

In an example, the configuration information may also indicate a second starting time for sending information to the base station in the second period. Then, the terminal may periodically send information to the base station in the unlicensed frequency band from the second starting time.

Since the second starting time may be configured by the base station to the terminal, the terminal is more likely to start sending information from the second starting time in the second period, and the base station starts receiving information sent by the terminal in the unlicensed frequency band from the second starting time in the second period, the base station can receive the information sent by the terminal as soon as possible in the second period and then determine a starting position of an uplink channel occupancy time as soon as possible.

Optionally, the second period includes at least one slot, and the second starting time is a symbol.

Optionally, the configuration information is used to indicate a target symbol where the second starting time is located in the at least one slot.

Optionally, the configuration information includes first partial information and second partial information;

The first partial information is used to indicate a target slot where the second starting time is located in the at least one slot, and the second partial information is used to indicate a target symbol where the second starting time is located in the target slot.

Figure 11:
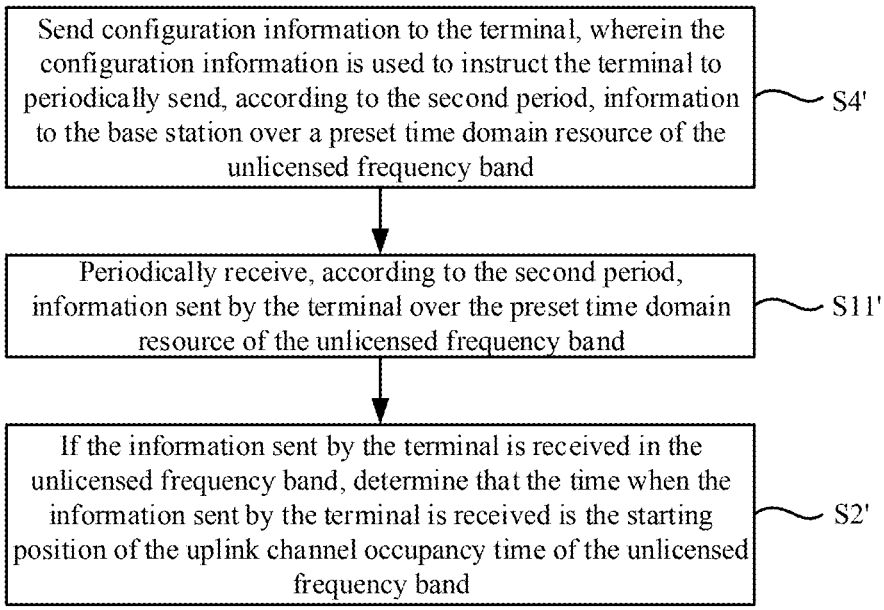
FIG. 11 is a schematic flowchart of yet another method for determining a starting position of a channel occupancy time according to an example of the present disclosure.

FIG. 11 is a schematic flowchart of yet another method for determining a starting position of a channel occupancy time according to an example of the present disclosure. As shown in FIG. 11, before periodically receiving, according to a second period, information sent by a terminal in an unlicensed frequency band, the method further includes:

In step S4', configuration information is sent to the terminal, wherein the configuration information is used to instruct the terminal to periodically send, according to the second period, information to the base station over a preset time domain resource of the unlicensed frequency band;

The periodically receiving, according to a second period, information sent by a terminal in an unlicensed frequency band includes:

In step S11', information sent by the terminal is periodically received according to the second period over the preset time domain resource of the unlicensed frequency band.

In an example, the configuration information may also configure a preset time domain resource, and information is periodically sent according to the second period to the base station over the preset time domain resource in the clear time period of the unlicensed frequency band.

Since the preset time domain resource may be configured by the base station to the terminal, that is, the base station may determine the preset time domain resource, the base station may receive the information sent by the terminal over the preset time domain resource of the unlicensed frequency band. Accordingly, the terminal can only send information to the base station over the preset time domain resource in the clear time period of the unlicensed frequency band, and the base station also only receives the information sent by the terminal over the preset time domain resource of the unlicensed frequency band, which avoids resource waste caused by the fact that the base station receives information sent by the terminal over time domain resources (the terminal does not send information to the base station over these time domain resources) other than the preset time domain resource.

Figure 12:
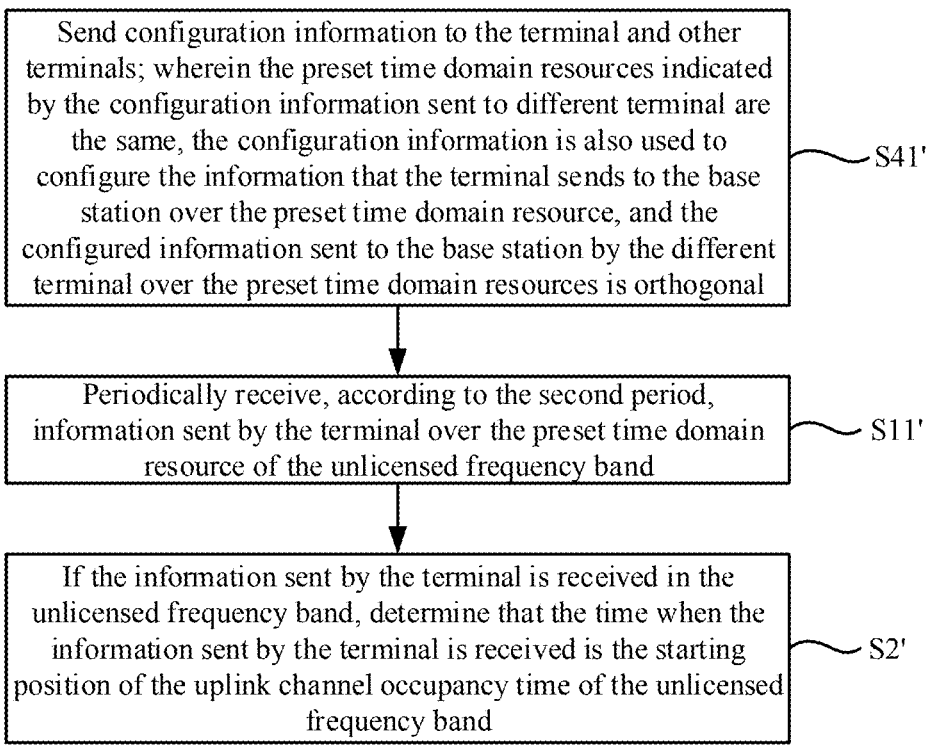
FIG. 12 is a schematic flowchart of yet another method for determining a starting position of a channel occupancy time according to an example of the present disclosure.

FIG. 12 is a schematic flowchart of yet another method for determining a starting position of a channel occupancy time according to an example of the present disclosure. As shown in FIG. 12, the sending configuration information to the terminal includes:

In step S41', configuration information is sent to the terminal and other terminals;

The preset time domain resources indicated by the configuration information sent to different terminal are the same, the configuration information is also used to configure the information that the terminal sends to the base station over the preset time domain resource, and the configured information sent to the base station by the different terminal over the preset time domain resources is orthogonal.

In an example, if the preset time domain resources indicated by the configuration information sent to different terminals are the same, the different terminals may send information to the base station over the same preset time domain resource, which may cause errors when the base station receives information.

In this regard, the terminal may be configured by the configuration information to send information to the base station over the preset time domain resource, and the configured information sent to the base station by the different terminal over the preset time domain resources is orthogonal. Since the information sent to the base station by the different terminal over the preset time domain resources is orthogonal, that is, the information sent to the base station by the different terminal over the same preset time domain resource is orthogonal, the base station that receives pieces of information over the same preset time domain resource can correctly analyze the orthogonal information.

For example, the base station may pre-define four orthogonal signals, signal 1, signal 2, signal 3, and signal 4, and configure signal 1 to terminal 1, signal 2 to terminal 2, signal 3 to terminal 3, and configure signal 4 to terminal 4, then the terminal 1, terminal 2, terminal 3, and terminal 4 can send signal 1, signal 2, signal 3, and signal 4 to the base station respectively over the same preset time domain resource. Because the four signals are orthogonal, the base station can accurately analyze each signal, thus determining that the signals sent by terminal 1, terminal 2, terminal 3, and terminal 4 are received over the preset time domain resource.

Figure 13:
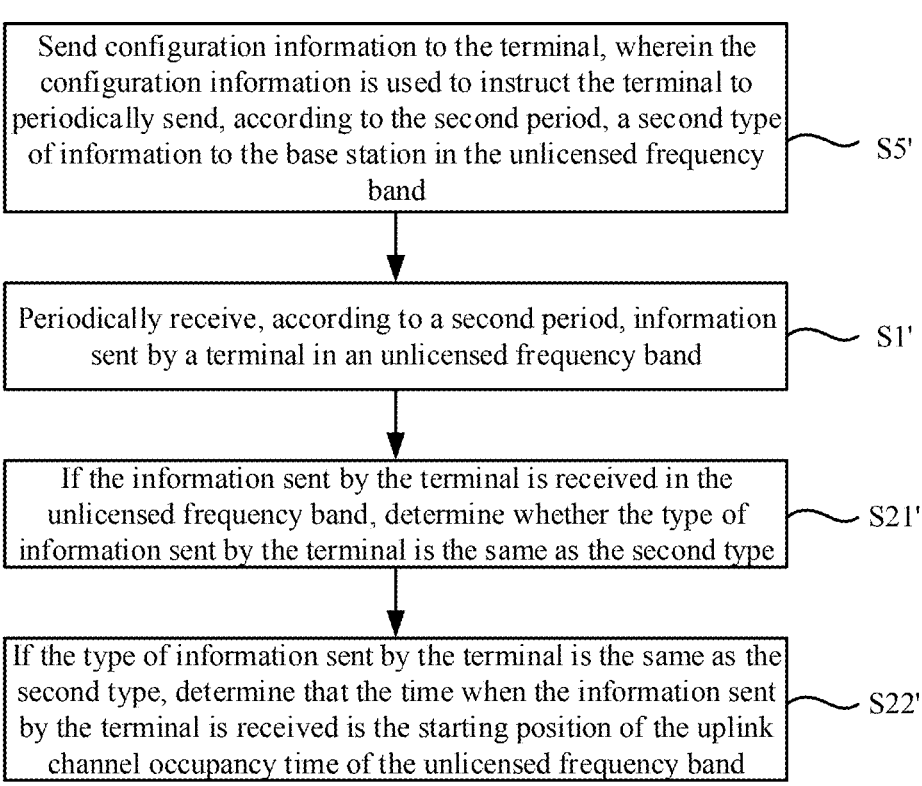
FIG. 13 is a schematic flowchart of yet another method for determining a starting position of a channel occupancy time according to an example of the present disclosure.

FIG. 13 is a schematic flowchart of yet another method for determining a starting position of a channel occupancy time according to an example of the present disclosure. As shown in FIG. 13, before periodically receiving, according to a second period, information sent by a terminal in an unlicensed frequency band, the method further includes:

In step S5', configuration information is sent to the terminal, wherein the configuration information is used to instruct the terminal to periodically send, according to the second period, a second type of information to the base station in the unlicensed frequency band;

The if the information sent by the terminal is received in the unlicensed frequency band, determining that the time when the information sent by the terminal is received is the starting position of the uplink channel occupancy time of the unlicensed frequency band includes:

In step S21', if the information sent by the terminal is received in the unlicensed frequency band, whether the type of information sent by the terminal is the same as the second type is determined;

In step S22', if the type of information sent by the terminal is the same as the second type, it is determined that the time when the information sent by the terminal is received is the starting position of the uplink channel occupancy time of the unlicensed frequency band.

In an example, the configuration information may also indicate a second type, and the terminal may periodically send, according to the second period, the second type of information to the base station in the clear time period of the unlicensed frequency band.

Since the second type may be configured by the base station to the terminal, that is, the base station may determine the second type, and when receiving information sent by the terminal in the unlicensed frequency band, the base station may detect whether the type of information sent by the terminal is the same as the second type; and only when the type of information sent by the terminal is the same as the second type, it is determined that the time when the information is received from the terminal is the starting position of the uplink channel occupancy time of the unlicensed frequency band.

Accordingly, the base station can only use the time when the terminal sends the second type of information as the starting position of the uplink channel occupancy time, which prevents the base station from mistakenly using the time when the terminal sends other types of information as the starting position of the uplink channel occupancy time.

Corresponding to the foregoing example of the method for determining a starting position of a channel occupancy time, the present disclosure further provides an example of an apparatus for determining a starting position of a channel occupancy time.

Figure 14:
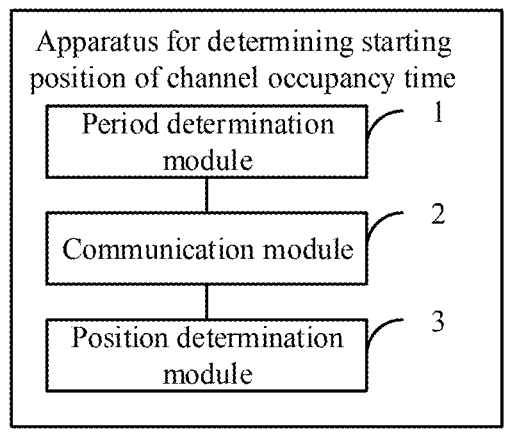
FIG. 14 is a schematic block diagram of an apparatus for determining a starting position of a channel occupancy time according to an example of the present disclosure.

FIG. 14 is a schematic block diagram of an apparatus for determining a starting position of a channel occupancy time according to an example of the present disclosure. The apparatus for determining a starting position of a channel occupancy time shown in this example may be applied to a terminal. The terminal includes but is not limited to electronic devices such as a mobile phone, a tablet computer, and a wearable device. The terminal may serve as user equipment to communicate with a base station, and it may communicate with the base station through a licensed frequency band (for example, a frequency band of an operator network), or communicate with the base station through an unlicensed frequency band (for example, a frequency band of a Wi-Fi network).

As shown in FIG. 14, the apparatus for determining a starting position of a channel occupancy time may include:

a period determination module 1, configured to determine, according to configuration information, a first period of a starting position of a downlink channel occupancy time, and/or a second period of a starting position of an uplink channel occupancy time;

a communication module 2, configured to periodically determine, according to the first period, whether information sent by a base station is received in an unlicensed frequency band, and/or periodically send, according to the second period, information to the base station in a clear time period of the unlicensed frequency band; and a position determination module 3, configured to determine that the time when the information is received from the base station is the starting position of the downlink channel occupancy time of the unlicensed frequency band when the information sent by the base station is received in the unlicensed frequency band.

Figure 15:
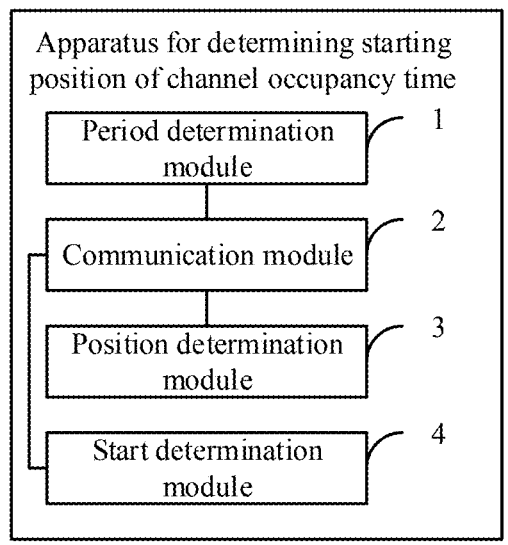
FIG. 15 is a schematic block diagram of another apparatus for determining a starting position of a channel occupancy time according to an example of the present disclosure.

FIG. 15 is a schematic block diagram of another apparatus for determining a starting position of a channel occupancy time according to an example of the present disclosure. As shown in FIG. 15, the apparatus further includes:

a start determination module 4, configured to determine, according to the configuration information, a first starting time for receiving information sent by the base station in the first period, and/or a second starting time for sending information to the base station in the second period;

The communication module 2 is configured to periodically determine from the first starting time, according to the first period, whether information sent by the base station is received in the unlicensed frequency band, and/or periodically send from the second starting time, according to the second period, information to the base station.

Optionally, the first period and/or the second period include at least one slot, and the first starting time and/or the second starting time are symbols.

Optionally, the configuration information is used to indicate target symbols where the first starting time and/or the second starting time are located in the at least one slot.

Optionally, the configuration information includes first partial information and second partial information;

The first partial information is used to indicate target slots where the first starting time and/or the second starting time are located in the at least one slot, and the second partial information is used to indicate target symbols where the first starting time and/or the second starting time are located in the target slots.

Figure 16:
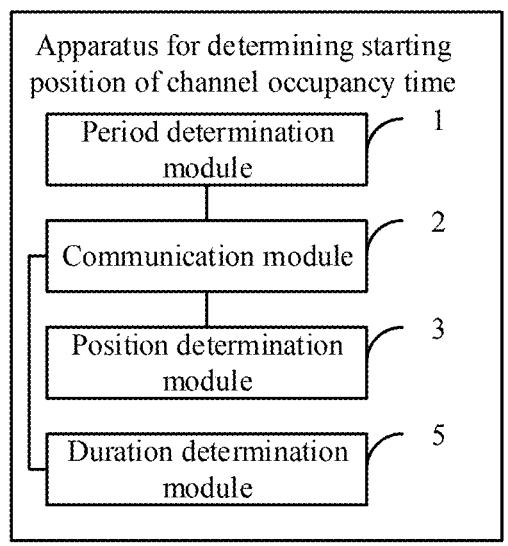
FIG. 16 is a schematic block diagram of yet another apparatus for determining a starting position of a channel occupancy time according to an example of the present disclosure.

FIG. 16 is a schematic block diagram of yet another apparatus for determining a starting position of a channel occupancy time according to an example of the present disclosure. As shown in FIG. 16, the apparatus further includes:

a duration determination module 5, configured to determine, according to the configuration information, a receiving duration of receiving information sent by the base station, and/or a sending duration of sending information to the base station;

The communication module 2 is configured to periodically determine for the receiving duration, according to the first period, whether information sent by the base station is received in the unlicensed frequency band, and/or periodically send for the sending duration, according to the second period, information to the base station in the clear time period of the unlicensed frequency band.

Figure 17:
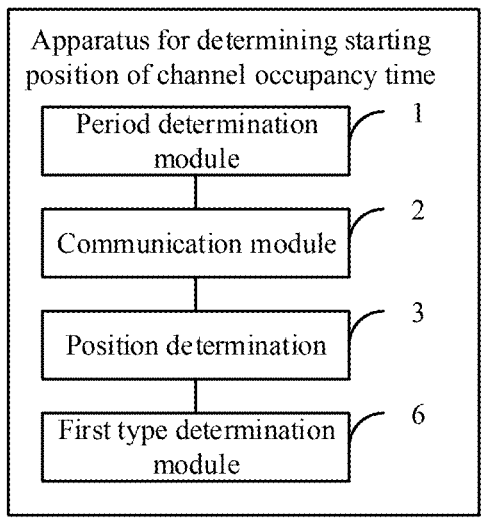
FIG. 17 is a schematic block diagram of yet another apparatus for determining a starting position of a channel occupancy time according to an example of the present disclosure.

FIG. 17 is a schematic block diagram of yet another apparatus for determining a starting position of a channel occupancy time according to an example of the present disclosure. As shown in FIG. 17, the apparatus further includes:

a first type determination module 6, configured to determine a first type according to the configuration information;

The position determination module 3 is configured to detect whether the type of information sent by the base station is the same as the first type if the information sent by the base station is received in the unlicensed frequency band, and determine that the time when the information is received from the base station is the starting position of the downlink channel occupancy time of the unlicensed frequency band if the type of information sent by the base station is the same as the first type.

Figure 18:
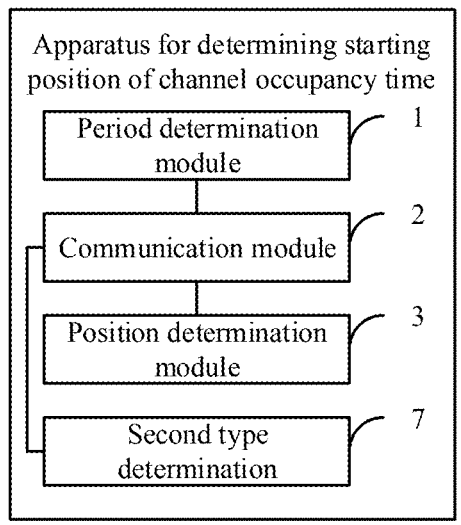
FIG. 18 is a schematic block diagram of yet another apparatus for determining a starting position of a channel occupancy time according to an example of the present disclosure.

FIG. 18 is a schematic block diagram of yet another apparatus for determining a starting position of a channel occupancy time according to an example of the present disclosure. As shown in FIG. 18, the apparatus further includes:

a second type determination module 7, configured to determine a second type according to the configuration information;

The communication module 2 is configured to periodically send, according to the second period, the second type of information to the base station in the clear time period of the unlicensed frequency band.

Figure 19:
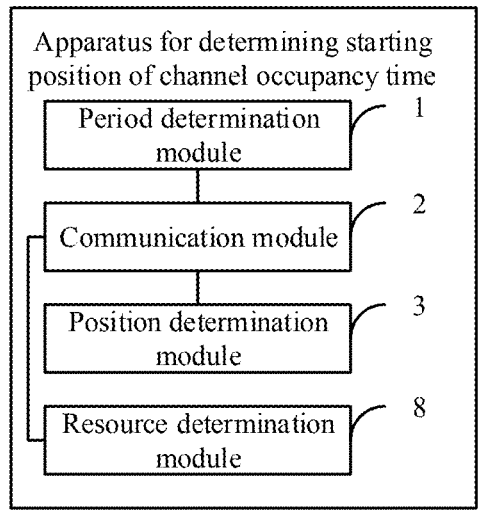
FIG. 19 is a schematic block diagram of yet another apparatus for determining a starting position of a channel occupancy time according to an example of the present disclosure.

FIG. 19 is a schematic block diagram of yet another apparatus for determining a starting position of a channel occupancy time according to an example of the present disclosure. As shown in FIG. 19, the apparatus further includes:

a resource determination module 8 is configured to determine a preset time domain resource according to the configuration information;

The communication module 2 is configured to periodically send, according to the second period, information to the base station over the preset time domain resource in the clear time period of the unlicensed frequency band.

Optionally, the configuration information is pre-defined or pre-configured by the base station.

Figure 20:
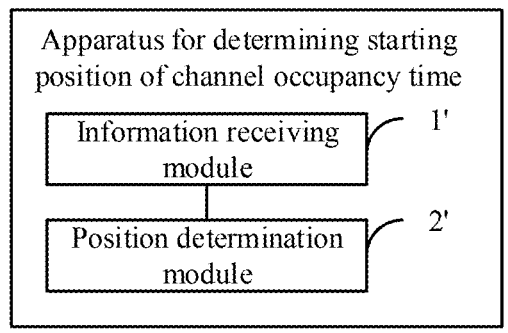
FIG. 20 is a schematic block diagram of an apparatus for determining a starting position of a channel occupancy time according to an example of the present disclosure.

FIG. 20 is a schematic block diagram of an apparatus for determining a starting position of a channel occupancy time according to an example of the present disclosure. The apparatus for determining a starting position of a channel occupancy time shown in this example may be applied to a base station. The terminal may communicate with the terminal in the above example, and it may communicate with the base station through a licensed frequency band (for example, a frequency band of an operator network), or communicate with the terminal through an unlicensed frequency band (for example, a frequency band of a Wi-Fi network).

As shown in FIG. 20, the apparatus for determining a starting position of a channel occupancy time may include:

an information receiving module 1', configured to periodically receive, according to a second period, information sent by a terminal in an unlicensed frequency band; and a position determination module 2', configured to determine that the time when the information sent by the terminal is received is the starting position of the uplink channel occupancy time of the unlicensed frequency band if the information sent by the terminal is received in the unlicensed frequency band.

Figure 21:
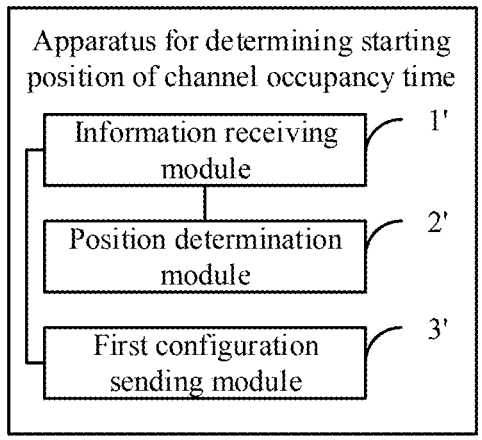
FIG. 21 is a schematic block diagram of another apparatus for determining a starting position of a channel occupancy time according to an example of the present disclosure.

FIG. 21 is a schematic block diagram of another apparatus for determining a starting position of a channel occupancy time according to an example of the present disclosure. As shown in FIG. 21, the apparatus further includes:

a first configuration sending module 3', configured to send configuration information to the terminal, wherein the configuration information is used to instruct the terminal to periodically send, according to the second period, information to the base station in a clear time period of the unlicensed frequency band.

Optionally, the configuration information is also used to indicate a second starting time when the terminal sends information to the base station in the second period.

Optionally, the second period includes at least one slot, and the second starting time is a symbol.

Optionally, the configuration information is used to indicate a target symbol where the second starting time is located in the at least one slot.

Optionally, the configuration information includes first partial information and second partial information;

The first partial information is used to indicate a target slot where the second starting time is located in the at least one slot, and the second partial information is used to indicate a target symbol where the second starting time is located in the target slot.

Figure 22:
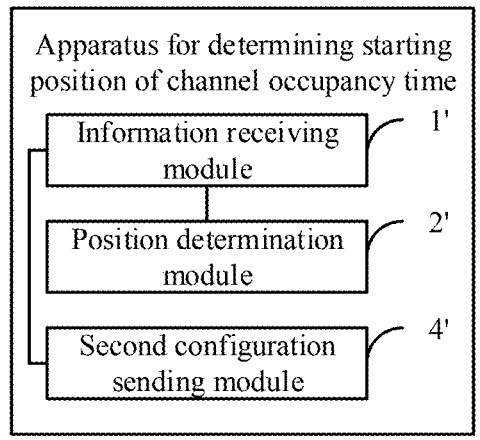
FIG. 22 is a schematic block diagram of yet another apparatus for determining a starting position of a channel occupancy time according to an example of the present disclosure.

FIG. 22 is a schematic block diagram of yet another apparatus for determining a starting position of a channel occupancy time according to an example of the present disclosure. As shown in FIG. 22, the apparatus further includes:

a second configuration sending module 4', configured to send configuration information to the terminal, wherein the configuration information is used to instruct the terminal to periodically send, according to the second period, information to the base station over a preset time domain resource of the unlicensed frequency band;

The information receiving module 1' is configured to periodically receive, according to the second period, information sent by the terminal over the preset time domain resource of the unlicensed frequency band.

Optionally, the second configuration sending module is configured to send configuration information to the terminal and other terminals;

The preset time domain resources indicated by the configuration information sent to different terminal are the same, the configuration information is also used to configure the information that the terminal sends to the base station over the preset time domain resource, and the configured information sent to the base station by the different terminal over the preset time domain resources is orthogonal.

Figure 23:
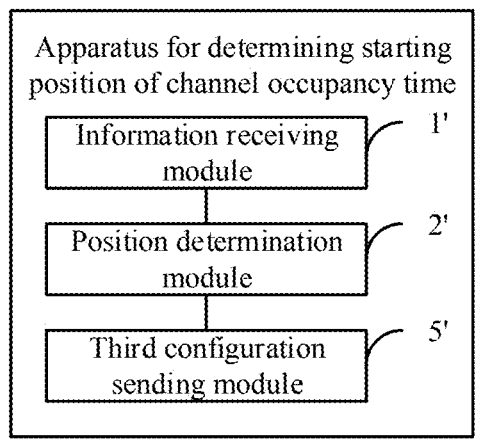
FIG. 23 is a schematic block diagram of yet another apparatus for determining a starting position of a channel occupancy time according to an example of the present disclosure.

FIG. 23 is a schematic block diagram of yet another apparatus for determining a starting position of a channel occupancy time according to an example of the present disclosure. As shown in FIG. 23, the apparatus further includes:

a third configuration sending module 5', configured to send configuration information to the terminal, wherein the configuration information is used to instruct the terminal to periodically send, according to the second period, a second type of information to the base station in the unlicensed frequency band;

The position determination module 3' is configured to determine whether the type of information sent by the terminal is the same as the second type if the information sent by the terminal is received in the unlicensed frequency band, and determine that the time when the information sent by the terminal is received is the starting position of the uplink channel occupancy time of the unlicensed frequency band if the type of information sent by the terminal is the same as the second type.

With regard to the apparatuses in the above examples, the specific manners that the respective modules perform operations have been described in detail in the examples relating to the methods, and details are not described herein.

The apparatus examples substantially correspond to the method examples, so reference may be made to the descriptions of the method examples. The apparatus examples described above are merely schematic, wherein the modules illustrated as separate components may be or may not be physically separated, and the components displayed as modules may be or may not be physical modules, that is, the components may be positioned at one place or may also be distributed on a plurality of network modules. Some or all of the modules may be selected according to actual needs to achieve the objectives of the solutions of the examples. Those of ordinary skill in the art can understand and implement without any creative effort.

The present disclosure further proposes an electronic device, including:

a processor; and a memory for storing processor executable instructions;

wherein, the processor is configured to implement the method applicable to a terminal as described in any of the above examples.

The present disclosure further proposes an electronic device, including:

a processor; and a memory for storing processor executable instructions;

wherein, the processor is configured to implement the method applicable to a base station as described in any of the above examples.

The present disclosure further proposes a computer-readable storage medium, storing a computer program on the storage medium, wherein when the program is executed by a processor, the steps in the method applicable to a terminal described in any of the above examples are implemented.

The present disclosure further proposes a computer-readable storage medium, storing a computer program on the storage medium, wherein when the program is executed by a processor, the steps in the method applicable to a base station described in any of the above examples are implemented.

Figure 24:
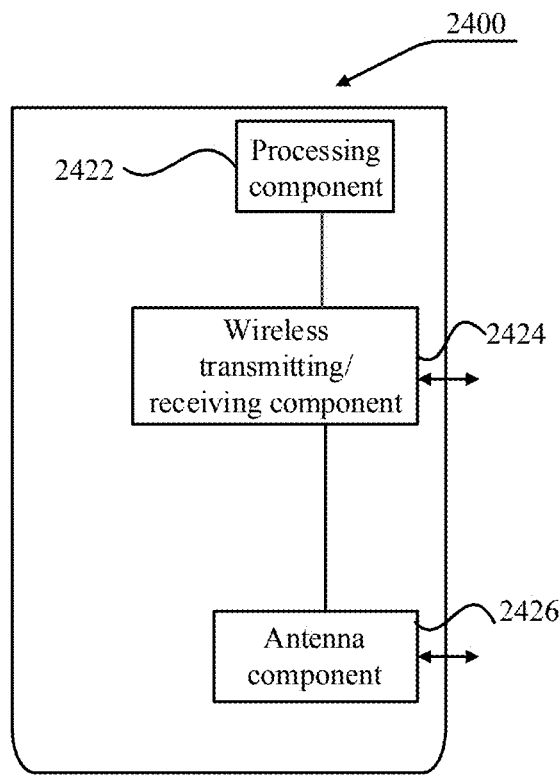
FIG. 24 is a schematic block diagram of an apparatus for determining a starting position of a channel occupancy time according to an example of the present disclosure.

As shown in FIG. 24, FIG. 24 is a schematic block diagram of an apparatus 2400 for determining a starting position of a channel occupancy time according to an example of the present disclosure. The apparatus 2400 may be provided as a base station. Referring to FIG. 24, the apparatus 2400 includes a processing component 2422, a wireless transmitting/receiving component 2424, an antenna component 2426, and a signal processing part specific to a wireless interface. The processing component 2422 may further include one or more processors. One of the processors in the processing component 2422 may be configured to implement the method applicable to the base station described in any of the above examples.

Figure 25:
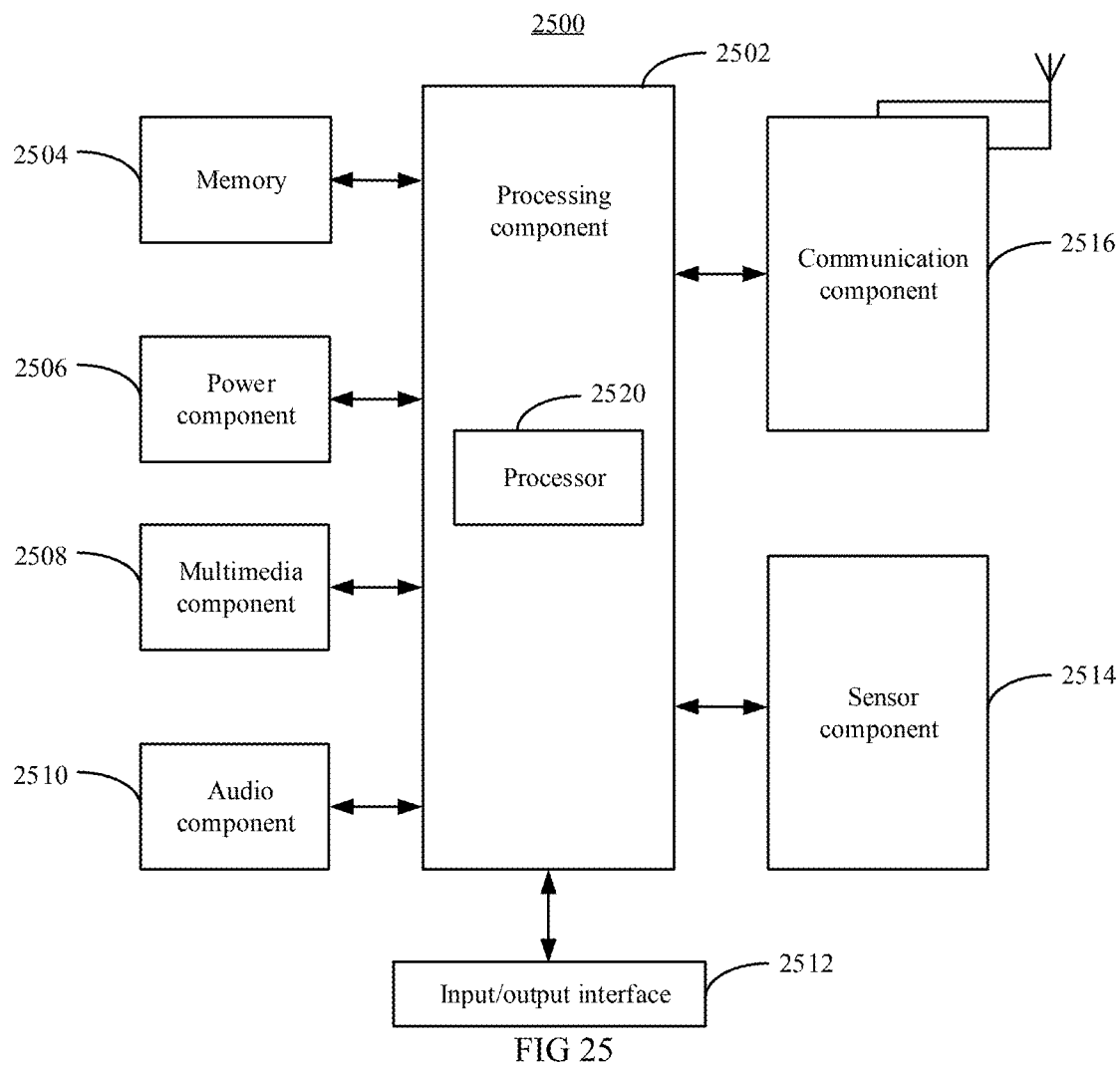
FIG. 25 is a schematic block diagram of an apparatus for determining a starting position of a channel occupancy time according to an example of the present disclosure.

FIG. 25 is a schematic block diagram of an apparatus 2500 for determining a starting position of a channel occupancy time according to an example of the present disclosure. For example, the apparatus 2500 may be a mobile phone, a computer, a digital broadcasting terminal, a messaging device, a game console, a tablet device, a medical device, a fitness device, a personal digital assistant, etc.

Referring to FIG. 25, the apparatus 2500 may include one or more of the following components: a processing component 2502, a memory 2504, a power component 2506, a multimedia component 2508, an audio component 2510, an input/output (I/O) interface 2512, a sensor component 2514, and a communication component 2516.

The processing component 2502 usually controls the overall operations of the apparatus 2500, such as operations associated with display, telephone call, data communication, camera operation and recording operation. The processing component 2502 may include one or more processors 2520 to execute instructions to complete all of or part of the steps of the above method. Moreover, the processing component 2502 may include one or more modules to facilitate interaction between the processing component 2502 and other components. For example, the processing component 2502 may include a multimedia module to facilitate interaction between the multimedia component 2508 and the processing component 2502.

The memory 2504 is configured to store various types of data to support operations at the apparatus 2500. Examples of these data include instructions for any disclosure or method operated on the apparatus 2500, contact data, phone book data, messages, pictures, videos, etc. The memory 2504 may be implemented by any type of volatile or non-volatile storage device, or a combination of them, such as a static random access memory (SRAM), an electrically erasable programmable read-only memory (EEPROM), an erasable. programmable read-only memory (EPROM), a programmable read-only memory (PROM), a read-only memory (ROM), a magnetic memory, a flash memory, a magnetic disk or an optical disk.

The power component 2506 supplies power to various components of the apparatus 2500. The power component 2506 may include a power management system, one or more power sources, and other components associated with power generation, management and distribution of the apparatus 2500.

The multimedia component 2508 includes a screen for providing an output interface between the apparatus 2500 and the user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides and gestures on the touch panel. The touch sensor may sense not only the boundary of the touch or slide, but also the duration and pressure associated with the touch or slide. In some examples, the multimedia component 2508 includes a front camera and/or a rear camera. When the apparatus 2500 is in an operation mode, such as a shooting mode or a video mode, the front camera and/or the rear camera can receive external multimedia data. Each front or rear camera may be a fixed optical lens system or have focal length and optical zoom capability.

The audio component 2510 is configured to output and/or input audio signals. For example, the audio component 2510 includes a microphone (MIC), which is configured to receive external audio signals when the apparatus 2500 is in an operation mode, such as a call mode, a recording mode and a voice recognition mode. The received audio signals may be further stored in the memory 2504 or sent by the communication component 2516. In some examples, the audio component 2510 further includes a speaker for outputting audio signals.

The I/O interface 2512 provides an interface between the processing component 2502 and a peripheral interface module. The peripheral interface module may be a keyboard, a click wheel, a button, etc. The button may include but is not limited to a home button, a volume button, a start button and a lock button.

The sensor component 2514 includes one or more sensors for providing various aspects of status assessment for the apparatus 2500. For example, the sensor component 2514 may detect the on/off state of the apparatus 2500, and relative positions of components such as a display and a keypad of the apparatus 2500. The sensor component 2514 may also detect a position change of the apparatus 2500 or one component of the apparatus 2500, presence or absence of contact between the user and the apparatus 2500, an orientation or acceleration/deceleration of the apparatus 2500 and a temperature change of the apparatus 2500. The sensor component 2514 may include a proximity sensor configured to detect the presence of nearby objects without any physical contact. The sensor component 2514 may also include an optical sensor, such as a CMOS or CCD image sensor, for use in imaging disclosures. In some examples, the sensor component 2514 may also include an acceleration sensor, a gyro sensor, a magnetic sensor, a pressure sensor, or a temperature sensor.

The communication component 2516 is configured to facilitate wired or wireless communication between the apparatus 2500 and other devices. The apparatus 2500 may access wireless networks based on communication standards, such as Wi-Fi, 2G, 3G, 4G LTE, 5G NR, or a combination them. In one example, the communication component 2516 receives broadcast signals or broadcast associated information from an external broadcast management system via a broadcast channel In one example, the communication component 2516 further includes a near field communication (NFC) module to facilitate short range communication. For example, the NFC module may be implemented based on radio frequency identification (RFID) technology, infrared data association (IrDA) technology, ultra wide band (UWB) technology, Bluetooth (BT) technology, and other technologies.

In an example, the apparatus 2500 may be implemented by one or more disclosure specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components to perform the method applicable to a terminal described in any of the above examples.

In an example, a non-transitory computer-readable storage medium including instructions is further provided, such as a memory 2504 including instructions executable by the processor 2520 of the apparatus 2500 to complete the above method. For example, the non-temporary computer-readable storage medium may be an ROM, a random access memory (RAM), a CD-ROM, a magnetic tape, a floppy disk, an optical data storage device, etc.

Those skilled in the art would readily conceive of other examples of the disclosure after considering the specification and practicing the disclosure herein. The present disclosure is intended to cover any variations, uses or adaptive changes of the present disclosure. These variations, uses or adaptive changes follow the general principle of the present disclosure and comprise common general knowledge or conventional technical means in the technical field that are not disclosed in the present disclosure. The description and the examples are merely regarded as exemplary, and the real scope and spirit of the disclosure are pointed out by the following claims.

It should be understood that the disclosure is not limited to the precise structure described above and shown in the drawings, and various modifications and changes can be made without departing from its scope. The scope of the disclosure is only limited by the appended claims.

It should be noted that the relational terms herein such as first and second are used only to differentiate an entity or operation from another entity or operation, and do not require or imply any actual relationship or sequence between these entities or operations. The terms "include", "comprise", or any variants are intended to cover a non-exclusive inclusion, so that a process, method, article, or device that includes a series of elements not only includes those elements, but also includes other elements not listed explicitly, or includes inherent elements of the process, method, article, or device. In the absence of more limitations, an element defined by "include a . . . " does not exclude other same elements existing in the process, method, article, or device including the element.

The methods and apparatuses provided by the examples of the present disclosure are described in detail above. Specific examples are used herein to illustrate the principles and implementations of the present disclosure. The descriptions of the above examples are only used to help understanding the method and core idea of the present disclosure. In addition, changes may be made to the specific examples and the disclosure scope according to the idea of the present disclosure for a person skilled in the art. To sum up, the content of the specification should not be understood as limitations to the present disclosure.

The invention claimed is:

1. A method for determining a starting position of a channel occupancy time, wherein the method performed by a terminal and comprises:
   determining, according to configuration information, a first period of a starting position of a downlink channel occupancy time, and/or a second period of a starting position of an uplink channel occupancy time;
   determining a first type according to the configuration information;
   periodically determining, according to the first period, whether information sent by a base station is received in an unlicensed frequency band, and/or periodically sending, according to the second period, information to the base station in a clear time period of the unlicensed frequency band;
   in response to the information sent by the base station is received in the unlicensed frequency band, detecting whether a type of information sent by the base station is the same as the first type; and
   in response to the type of information sent by the base station is the same as the first type, determining that the time when the information is received from the base station is the starting position of the downlink channel occupancy time of the unlicensed frequency band.

2. The method according to claim 1, wherein before periodically determining, according to the first period, whether information sent by the base station is received in the unlicensed frequency band, and/or periodically sending, according to the second period, information to the base station in the clear time period of the unlicensed frequency band, and the method further comprises:

determining, according to the configuration information, a first starting time for receiving information sent by the base station in the first period, and/or a second starting time for sending information to the base station in the second period;

wherein the periodically determining, according to the first period, whether information sent by the base station is received in the unlicensed frequency band, and/or periodically sending, according to the second period, information to the base station in the clear time period of the unlicensed frequency band comprises:

periodically determining from the first starting time, according to the first period, whether information sent by the base station is received in the unlicensed frequency band, and/or periodically sending from the second starting time, according to the second period, information to the base station.

3. The method according to claim 2, wherein the first period and/or the second period comprise at least one slot, and the first starting time and/or the second starting time are symbols.

4. The method according to claim 3, wherein the configuration information comprises first partial information and second partial information; and wherein the first partial information is used to indicate target slots where the first starting time and/or the second starting time are located in the at least one slot, and the second partial information is used to indicate target symbols where the first starting time and/or the second starting time are located in the target slots.

5. The method according to claim 1, wherein before periodically determining, according to the first period, whether information sent by the base station is received in the unlicensed frequency band, and/or periodically sending, according to the second period, information to the base station in the clear time period of the unlicensed frequency band, and the method further comprises:

determining, according to the configuration information, a receiving duration of receiving information sent by the base station, and/or a sending duration of sending information to the base station;

wherein the periodically determining, according to the first period, whether information sent by the base station is received in the unlicensed frequency band, and/or periodically sending, according to the second period, information to the base station in the clear time period of the unlicensed frequency band comprises:

periodically determining for the receiving duration, according to the first period, whether information sent by the base station is received in the unlicensed frequency band, and/or periodically sending for the sending duration, according to the second period, information to the base station in the clear time period of the unlicensed frequency band.

6. The method according to claim 1, wherein before periodically determining, according to the first period, whether information sent by the base station is received in the unlicensed frequency band, and/or periodically sending, according to the second period, information to the base station in the clear time period of the unlicensed frequency band, and the method further comprises:

determining a second type according to the configuration information;

wherein the periodically sending, according to the second period, information to the base station in the clear time period of the unlicensed frequency band comprises:

periodically sending, according to the second period, the second type of information to the base station in the clear time period of the unlicensed frequency band.

7. The method according to claim 1, wherein before periodically determining, according to the first period, whether information sent by the base station is received in the unlicensed frequency band, and/or periodically sending, according to the second period, information to the base station in the clear time period of the unlicensed frequency band, and the method further comprises:

determining a preset time domain resource according to the configuration information;

wherein the periodically sending, according to the second period, information to the base station in the clear time period of the unlicensed frequency band comprises:

periodically sending, according to the second period, information to the base station over the preset time domain resource in the clear time period of the unlicensed frequency band.

8. A non-transitory computer-readable storage medium storing a computer program thereon wherein, when the computer program is executed by a processor, the processor performs the steps of the method according to claim 1.

9. A method for determining a starting position of a channel occupancy time, wherein the method performed by a base station and comprises:

sending configuration information to the terminal and other terminals;

periodically receiving, according to a second period, information sent by a terminal in an unlicensed frequency band; and in response to the information sent by the terminal is received in the unlicensed frequency band, determining that a time when the information sent by the terminal is received is the starting position of an uplink channel occupancy time of the unlicensed frequency band;

wherein the configuration information is used to instruct the terminal to periodically send, according to the second period, information to the base station over a preset time domain resource of the unlicensed frequency band; wherein the preset time domain resource indicated by the configuration information sent to different terminal are the same, the configuration information is also used to configure the information that the terminal sends to the base station over the preset time domain resource, and the configured information sent to the base station by the different terminal over the preset time domain resources is orthogonal; wherein the periodically receiving according to the second period, information sent by the terminal in the unlicensed frequency band comprises: periodically receiving, according to the second period, information sent by the terminal over the preset time domain resource of the unlicensed frequency band; or wherein the configuration information is used to instruct the terminal to periodically send, according to the second period, a second type of information to the base station in the unlicensed frequency band; wherein in response to the information sent by the terminal is received in the unlicensed frequency band, determining that the time when the information sent by the terminal is received is the starting position of the uplink channel occupancy time of the unlicensed frequency band comprises:

in response to the information sent by the terminal is received in the unlicensed frequency band, determining whether the type of information sent by the terminal is the same as the second type; and in response to the type of information sent by the terminal is the same as the second type, determining that the time when the information sent by the terminal is received is the starting position of the uplink channel occupancy time of the unlicensed frequency band.

10. The method according to claim 9, wherein the configuration information is also used to indicate a second starting time when the terminal sends information to the base station in the second period.

11. The method according to claim 10, wherein the second period comprises at least one slot, and the second starting time is a symbol.

12. The method according to claim 11, wherein the configuration information comprises first partial information and second partial information; and
wherein the first partial information is used to indicate a target slot where the second starting time is located in the at least one slot, and the second partial information is used to indicate a target symbol where the second starting time is located in the target slot.

13. An electronic device, comprising:
a processor; and
a memory for storing processor executable instructions;
wherein, responsive to executing the executable instructions, the processor is configured to implement the method according to claim 9.

14. A non-transitory computer-readable storage medium storing a computer program thereon wherein, when the program is executed by a processor, the processor performs the steps of the method according to claim 9.

15. An electronic device, comprising:
a processor; and
a memory for storing processor executable instructions;
wherein the processor is configured to implement a method for determining a starting position of a channel occupancy time, the method comprising:
determining, according to configuration information, a first period of a starting position of a downlink channel occupancy time, and/or a second period of a starting position of an uplink channel occupancy time;
determining a first type according to the configuration information;
periodically determining, according to the first period, whether information sent by a base station is received in an unlicensed frequency band, and/or periodically sending, according to the second period, information to the base station in a clear time period of the unlicensed frequency band;
in response to the information sent by the base station is received in the unlicensed frequency band, detecting whether a type of information sent by the base station is the same as the first type; and
in response to the type of information sent by the base station is the same as the first type, determining that the time when the information is received from the base station is the starting position of the downlink channel occupancy time of the unlicensed frequency band.

* * * * *